United States Patent [19]
Velepec

[11] Patent Number: 5,352,072
[45] Date of Patent: Oct. 4, 1994

[54] CUTTING TOOL WITH GUIDE FOR TRIMMING LAMINATE

[75] Inventor: Fredric A. Velepec, Glendale, N.Y.

[73] Assignee: Fred M. Velepec Co., Inc., Glendale, N.Y.

[21] Appl. No.: 24,595

[22] Filed: Mar. 1, 1993

[51] Int. Cl.5 .......................... B23C 3/12; B27D 5/00
[52] U.S. Cl. ...................... 409/126; 407/2; 144/145 C; 144/253 D
[58] Field of Search .......... 144/218, 220, 221, 251 A, 144/251 B, 253 D, 145 C; 407/1, 2, 30; 409/124, 126

[56] References Cited

U.S. PATENT DOCUMENTS

| | | | |
|---|---|---|---|
| 706,488 | 8/1902 | Crapp | 144/145 C |
| 947,079 | 1/1910 | Latcham | 144/145 C |
| 1,136,415 | 4/1915 | Fellows | 144/253 D |
| 4,960,352 | 10/1990 | Kishi | 407/30 |
| 4,992,011 | 2/1991 | Cesark | 409/126 |
| 5,017,060 | 5/1991 | Shiratori et al. | 407/2 |
| 5,044,843 | 9/1991 | Velepec | 409/126 |

FOREIGN PATENT DOCUMENTS

| | | | |
|---|---|---|---|
| 615650 | 1/1927 | France | 144/253 D |
| 4216902 | 8/1992 | Japan | 144/253 D |
| 173465 | 1/1922 | United Kingdom | 144/253 D |

*Primary Examiner*—William E. Terrell
*Attorney, Agent, or Firm*—Kenyon & Kenyon

[57] ABSTRACT

A cutting tool for trimming a laminate flush with the surface of a substantially perpendicular laminate. The cutting tool includes a ball bearing guide assembly and a glue well shaft section. This glue well shaft section prevents softened glue encountered during trimming operations from contacting the ball bearing guide assembly. A washer provided between the glue well shaft section and the ball bearing guide assembly further prevents softened glue encountered during trimming operations from contacting the ball bearing guide assembly.

8 Claims, 1 Drawing Sheet

CUTTING TOOL WITH GUIDE FOR TRIMMING LAMINATE

BACKGROUND OF THE INVENTION

The present invention relates to a cutting tool and in particular to a cutting tool, such as a router bit, used to trim plastic laminates. In the past, flush or bevel trimming of laminated plastic was accomplished by using a carbide tipped router bit. Such router bits typically include a steel ball bearing guide assembly beneath the cutting portion of the router bit.

When finishing cabinets, countertops, etc., a core material, for example plywood, chip board, or particle board is covered with a plastic sheet side apron as well as a plastic sheet top which overhangs the laminated side apron. These plastic sheets are typically fixed to the core material with adhesive. Often, before hardening, this adhesive material is forced from beneath the sheet, past the edge of the sheet, to the side and top of the sheet where it then hardens.

When trimming or removing the overhanging (i.e., excess) portion of the top sheet, a cutting tool such as a router bit is used to trim the excess material. A steel ball bearing guide assembly disposed closely beneath the cutting portion of the bit is employed as a guide and rolls along the side apron thereby ensuring that the edge of the top sheet is flush with the side apron sheet. However, due to the friction resulting from this trimming operation, the temperature of both the cutting tool and the material becomes elevated. This increase in temperature causes previously hardened adhesive to become soft and more fluid. It has been found that such soft adhesive sometimes flows down onto the outer radial surface of, and into, the ball bearing guide assembly. When the adhesive rehardens, the ball bearing guide becomes ineffective and, as a result, the edge of top sheet being trimmed will not be smooth and flush with the side apron sheet.

Thus, there is a need to provide a cutting tool such as a router bit for use in the above described applications in which the ball bearing guide assembly is protected from softened adhesive.

SUMMARY OF THE INVENTION

The present invention meets the aforementioned need by providing a cutting tool having a glue well above the ball bearing guide assembly which catches the softened glue before it reaches the ball bearing guide assembly. That is, sufficient spacing or a well is provided along the length of the tool so that the softened glue re-hardens before it can reach or collect in the ball bearing guide assembly.

It has been found that providing the glue well directly between the bottom of the tool bit cutting section and the top of the ball bearing guide assembly is most effective. In particular, the glue well is most effective when the length of the well is at least ¾ of the dimension of its diameter, and preferably between ¾ of the dimension of its diameter and equal to the dimension of its diameter. Moreover, best results have been achieved when the diameter of the tool at the tool bit cutting section is approximately twice the diameter of the shaft forming the glue well. In this manner, sufficient spacing is provided to allow any softened adhesive to accumulate without interfering with the ball bearing guide assembly and without running into or onto the ball bearing guide assembly. Furthermore, such providing a glue well with such a length allows for any collected adhesive to be easily removed from the shaft section.

DETAILED DESCRIPTION

Figure 1A:
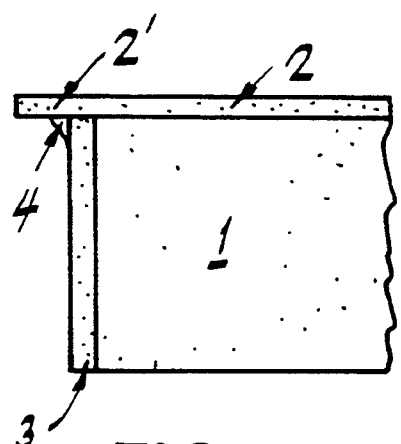
FIGS. 1a and 1b illustrate a typical trimming application in which a cutting tool may be used.
Figure 1B:
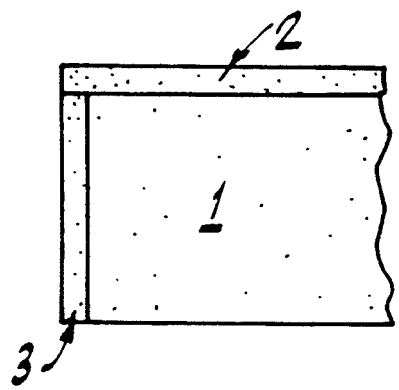

FIGS. 1a and 1b illustrate a typical trimming application in which cutting tools such as router bits may be employed. As shown in FIG. 1a, an apron 3 or side piece of laminate (for example, plastic laminate) is glued to a side of a core material 1. A top piece 2 of laminate (for example, plastic laminate) is then glued to the top of the core material 1 such that the top piece 2 of laminate slightly overhangs 2' the side apron 3. Frequently, excess glue 4 may seep out to the edges of the laminate and harden. As shown in FIG. 1b, the top piece 2 is then trimmed with a cutting tool such as a router bit to remove the excess material 2' such that its edge is flush with the side apron 3. When excess glue is in the region being worked on, it may soften and collect on the cutting tool. In other words, due to the friction resulting from this trimming operation, the temperature of both the router bit and the laminate material becomes elevated. This increase in temperature causes the previously hardened adhesive 4 to become soft and more fluid. Such soft adhesive could then flow down onto the outer radial surface of, and into, the ball bearing guide assembly. When this adhesive re-hardens, the ball bearing guide assembly may become ineffective and, as a result, the edge of the material being trimmed will be not smooth and flush with the side apron.

Figure 2:
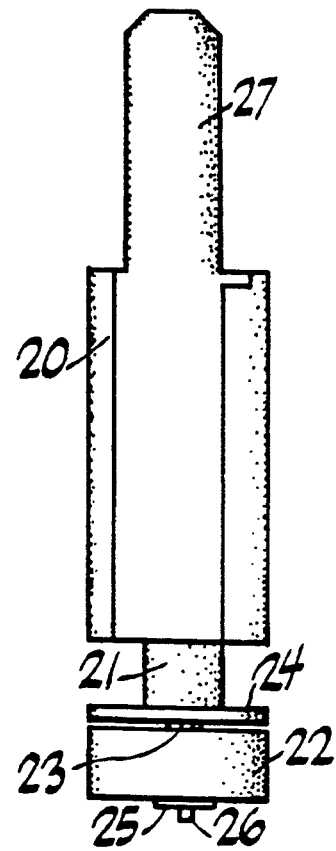
FIG. 2 is a side view of a router bit with a ball bearing guide assembly according to the present invention.
Figure 3:
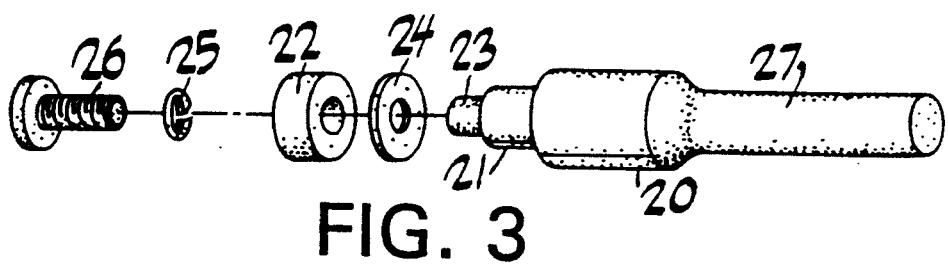
FIG. 3 is an exploded perspective view of the router bit assembly of the present invention.
Figure 4:
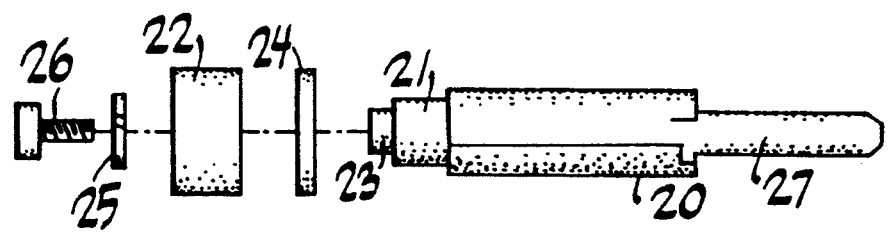
FIG. 4 is an exploded side view of a router bit assembly according to the present invention.

As shown in FIGS. 2 through 4, the router bit of the present invention includes a glue well 21 disposed between the cutting portion 20, of a conventional carbide tipped flush trim bit or a conventional carbide tipped bevel trim bit, for example, and the ball bearing guide assembly 22. Glue well 21 provides an extended surface on which softened glue can re-harden thereby preventing the softened glue from reaching the ball bearing guide assembly 22. The shaft section which extends from beneath the cutting portion 20 forms glue well 21. It has been found that when the length of the shaft section forming the glue well 21 is at least ¾ of the dimension of the outer diameter of the shaft section forming the glue well 21 and preferably, between ¾ of the dimension of the outer diameter and equal to the dimension of the outer diameter, and when the diameter of the shaft section forming the glue well is approximately ½ of the tool bit diameter at the cutting section, the softened glue rehardens before it can reach the ball bearing guide assembly. Taking a ½ inch diameter tool bit cutting section for example, the dimension of the outer diameter of the shaft section forming the glue well is ¼ of an inch, and the length of the shaft section is at least 3/16 of an inch, and preferably between 3/16 of an inch and ¼ of an inch. Shaft section 23 is disposed below the glue well 21 and has an outer diameter which is smaller than that of the shaft section forming the glue well 21. The second shaft section 23 includes a threaded receptacle for receiving a screw type fastener. A disk member 24 (e.g., a washer) having an inner diameter slightly larger than the outer diameter of the second shaft section 23 is inserted onto the second shaft section 23. The width of the disk member 24 is less than the length of the second shaft section 23. The outer diameter of the disk member 24 is slightly less than the outer diameter of the ball bearing guide assembly 22 so that the disk member 24 will not contact or scratch the laminate during a trimming operation. It has been found that providing such a washer 24 affords additional protection for preventing softened glue from reaching the ball bearing guide assembly 22.

A ball bearing guide assembly 22, having an inner diameter slightly larger than the outer diameter of the second shaft section, is then inserted onto a remaining length of the second shaft section 23. A screw type fastener 26 is fitted with a lock washer 25 and is then inserted into the threaded receptacle of the second shaft section 23. At its top portion, the router bit includes a first shaft section 27 adapted to be held in the chuck of a router.

The router bit according to the present invention advantageously permits the router bit to be used for extended periods before having to remove any accumulated glue from the glue well. As a result, the ball bearing guide assembly functions properly and a smooth, flush edge is ensured.

In the foregoing specification, the present invention has been described with reference to a specific exemplary embodiment thereof. Clearly, however, various modifications and changes may be made without departing from the broader scope and teaching of the specification. Therefore, the specification and the drawings are to be regarded in an illustrative rather than in a restrictive sense.

What is claimed is:

1. A cutting tool for trimming a laminate flush with the surface of a substantially perpendicular laminate, said cutting tool comprising:
   a) a first shaft section having an axis and being adapted to be accommodated in a chuck;
   b) a cutting section, said cutting section adapted to trim laminates, being coaxial with said first shaft section and having a first side and a second side, said first side being adjacent to said first shaft section;
   c) a glue well shaft section being coaxial with said first shaft section, having an outer diameter, and extending from said second side of said cutting section;
   d) a second shaft section being coaxial with said first shaft section, extending from said glue well shaft, and having an outer diameter which is less than said outer diameter of said glue well shaft section; and
   e) a ball bearing guide assembly accommodated on at least a portion of said second shaft section,
   wherein said glue well is dimensioned such that softened glue resulting from trimming operations rehardens on said glue well such that softened glue is kept from contacting said ball bearing guide assembly, and
   wherein said glue well shaft section has a length which is between approximately ¾ of the dimension of said outer diameter of said glue well shaft section and the dimension of said outer diameter of said glue well shaft section.

2. A cutting tool for trimming a laminate flush with the surface of a substantially perpendicular laminate, said cutting tool comprising:
   a) a first shaft section having an axis and being adapted to be accommodated in a chuck;
   b) a cutting section being coaxial with said first shaft section and having a first side and a second side, said first side being adjacent to said first shaft section;
   c) a glue well shaft section being coaxial with said first shaft section, having an outer diameter, and extending from said second side of said cutting section;
   d) a second shaft section being coaxial with said first shaft section, extending from said glue well shaft, and having an outer diameter which is less than said outer diameter of said glue well shaft section; and
   e) a ball bearing guide assembly accommodated on at least a portion of said second shaft section,
   wherein said glue well prevents softened glue resulting from trimming operations from contacting said ball bearing guide assembly, and
   wherein said glue well shaft section has a length which is at least ¾ of the dimension of said outer diameter of said glue well shaft section.

3. A cutting tool for trimming a laminate flush with the surface of a substantially perpendicular laminate, said cutting tool comprising:
   a) a first shaft section having an axis and being adapted to be accommodated in a chuck;
   b) a cutting section being coaxial with said first shaft section and having a first side and a second side, said first side being adjacent to said first shaft section;
   c) a glue well shaft section being coaxial with said first shaft section, having an outer diameter, and extending from said second side of said cutting section;
   d) a second shaft section being coaxial with said first shaft section, extending from said glue well shaft, and having an outer diameter which is less than said outer diameter of said glue well shaft section; and
   e) a ball bearing guide assembly accommodated on at least a portion of said second shaft section,
   wherein said glue well prevents softened glue resulting from trimming operations from contacting said ball bearing guide assembly, and
   wherein said glue well shaft section has a length which is between ¾ of the dimension of said outer diameter of said glue well shaft section and equal to the dimension of said outer diameter of said glue well shaft section.

4. The cutting tool of claim 2 further comprising a fastener, said fastener being held in a void in said second shaft thereby maintaining the accommodation of said ball bearing guide assembly on said second shaft section.

5. The cutting tool of claim 3 further comprising a fastener, said fastener being held in a void in said second shaft thereby maintaining the accommodation of said ball bearing guide assembly on said second shaft section.

6. A cutting tool for trimming a laminate flush with the surface of a substantially perpendicular laminate, said cutting tool comprising:
   a) a first shaft section having an axis and being adapted to be accommodated in a chuck;

b) a cutting section, said cutting section adapted to trim laminates, being coaxial with said first shaft section and having a first side and a second side, said first side being adjacent to said first shaft section;

c) a glue well shaft section being coaxial with said first shaft section, having an outer diameter, and extending from said second side of said cutting section;

d) a second shaft section being coaxial with said first shaft section, extending from said glue well shaft, and having an outer diameter which is less than said outer diameter of said glue well shaft section;

e) a washer accommodated on said second shaft section; and f) a ball bearing guide assembly accommodated on at least a portion of said second shaft section, wherein said glue well is dimensioned such that softened glue resulting from trimming operations rehardens such that softened glue is kept from contacting the ball bearing guide assembly and said washer further prevents softened glue resulting from trimming operations from contacting said ball bearing guide assembly, and wherein said glue well shaft section has a length which is between approximately $\frac{3}{4}$ of the dimension of said outer diameter of said glue well shaft section and the dimension of said outer diameter of said glue well shaft section.

7. The cutting tool of claim 6 wherein said ball bearing guide assembly has an outer diameter anti said washer has an outer diameter which is slightly less than said outer diameter of said ball bearing guide assembly.

8. The cutting tool of claim 7 further comprising a fastener, said fastener being held in a void in said second shaft thereby maintaining the accommodation of said ball bearing guide assembly on said second shaft section.

* * * * *